A. C. DITTRICH.
TIME CONTROLLING MEANS FOR SOUND REPRODUCING MECHANISM.
APPLICATION FILED MAR. 7, 1919.
1,373,176.
Patented Mar. 29, 1921.
5 SHEETS—SHEET 1.
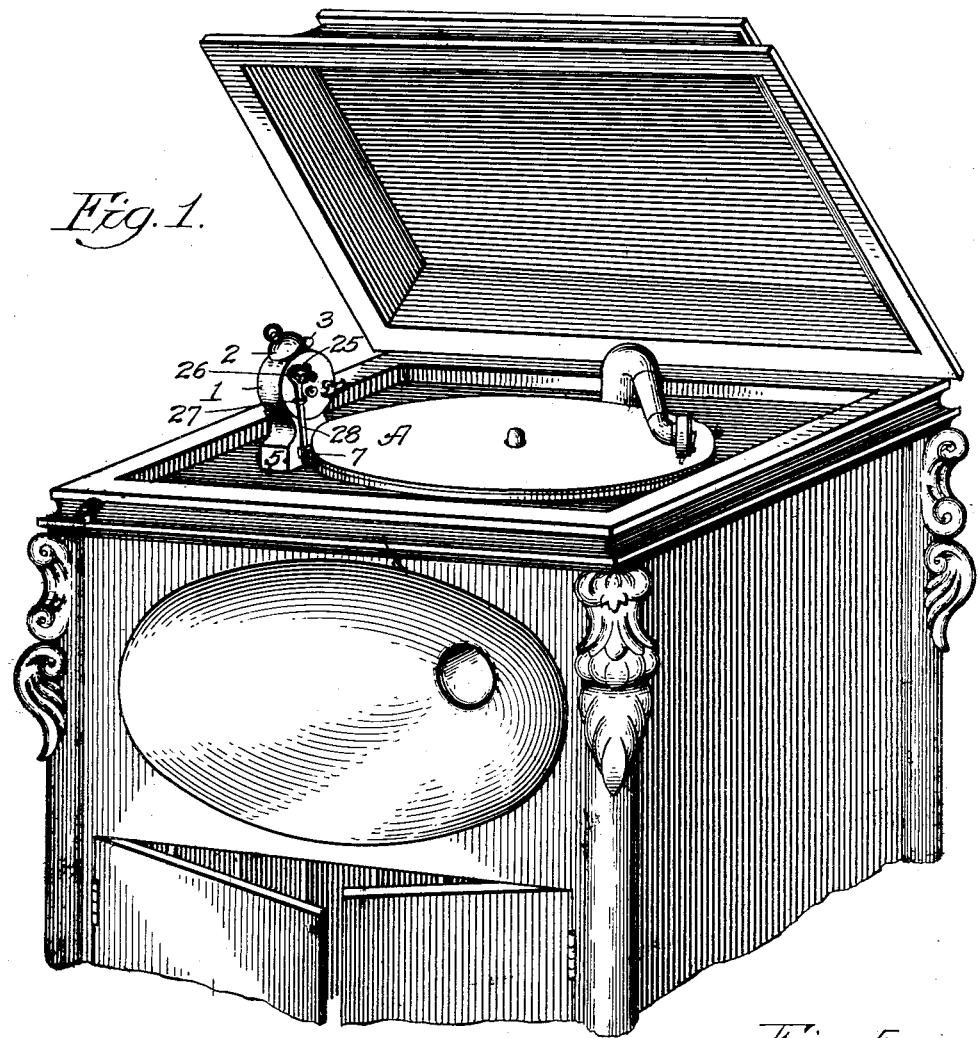
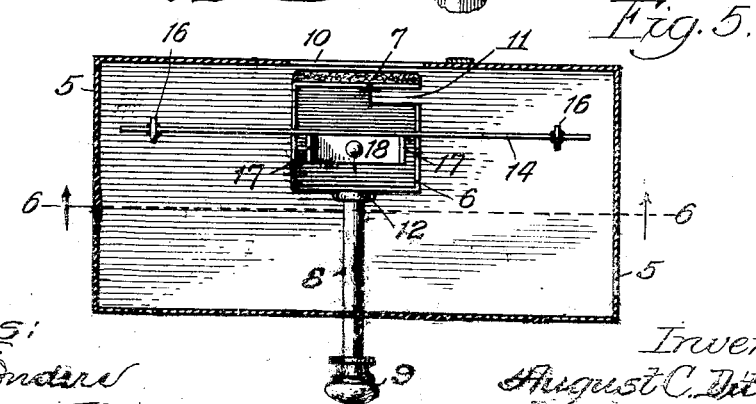

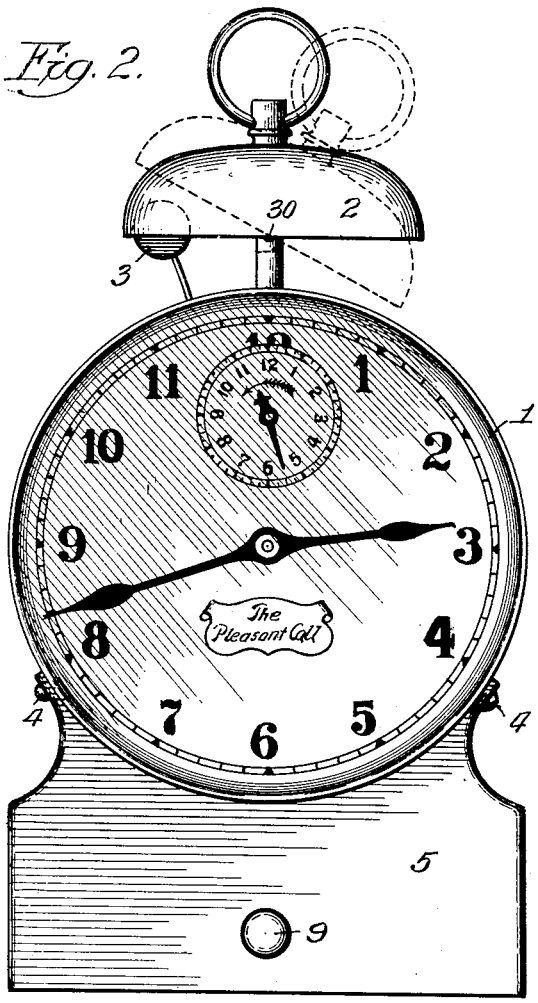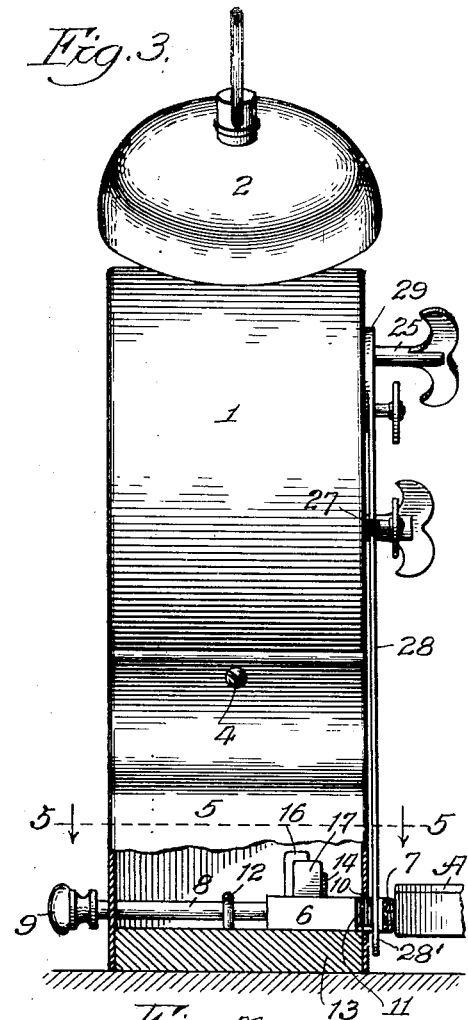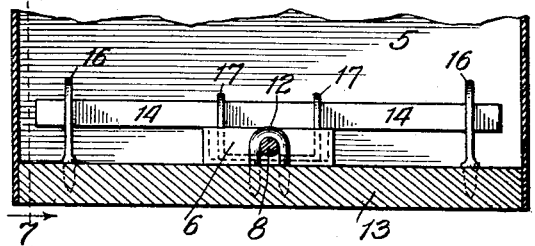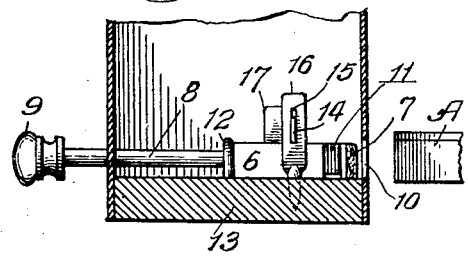

A. C. DITTRICH.
TIME CONTROLLING MEANS FOR SOUND REPRODUCING MECHANISM.
APPLICATION FILED MAR. 7, 1919.
1,373,176.
Patented Mar. 29, 1921.
5 SHEETS—SHEET 3.
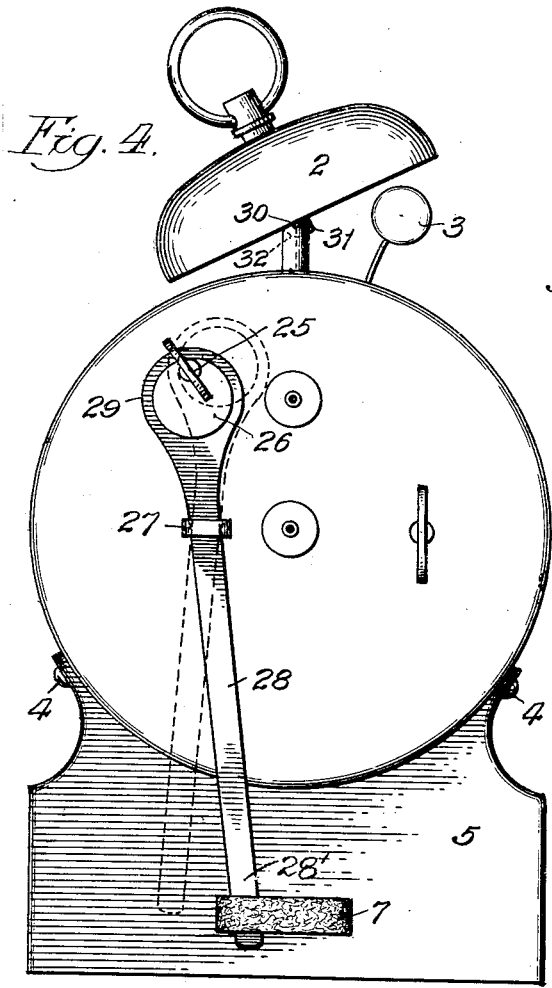
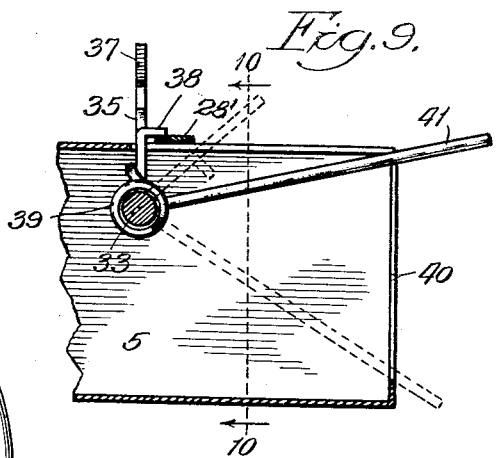
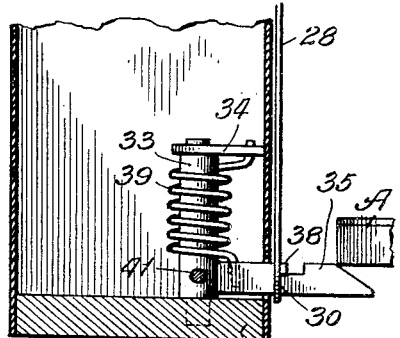
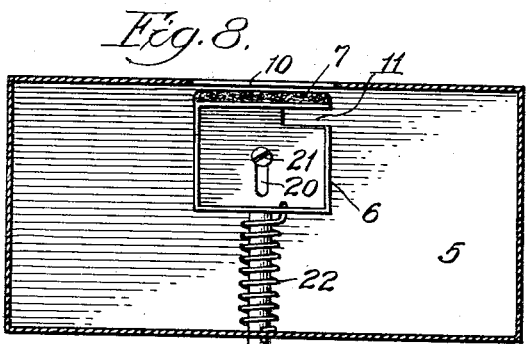
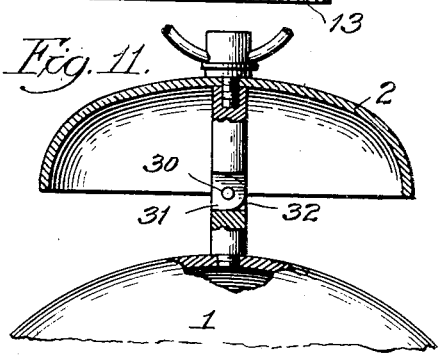
Witness:
John Enders
Frederick F. Mason
Inventor:
August C. Dittrich,
by Wallace R. Lane
Atty.

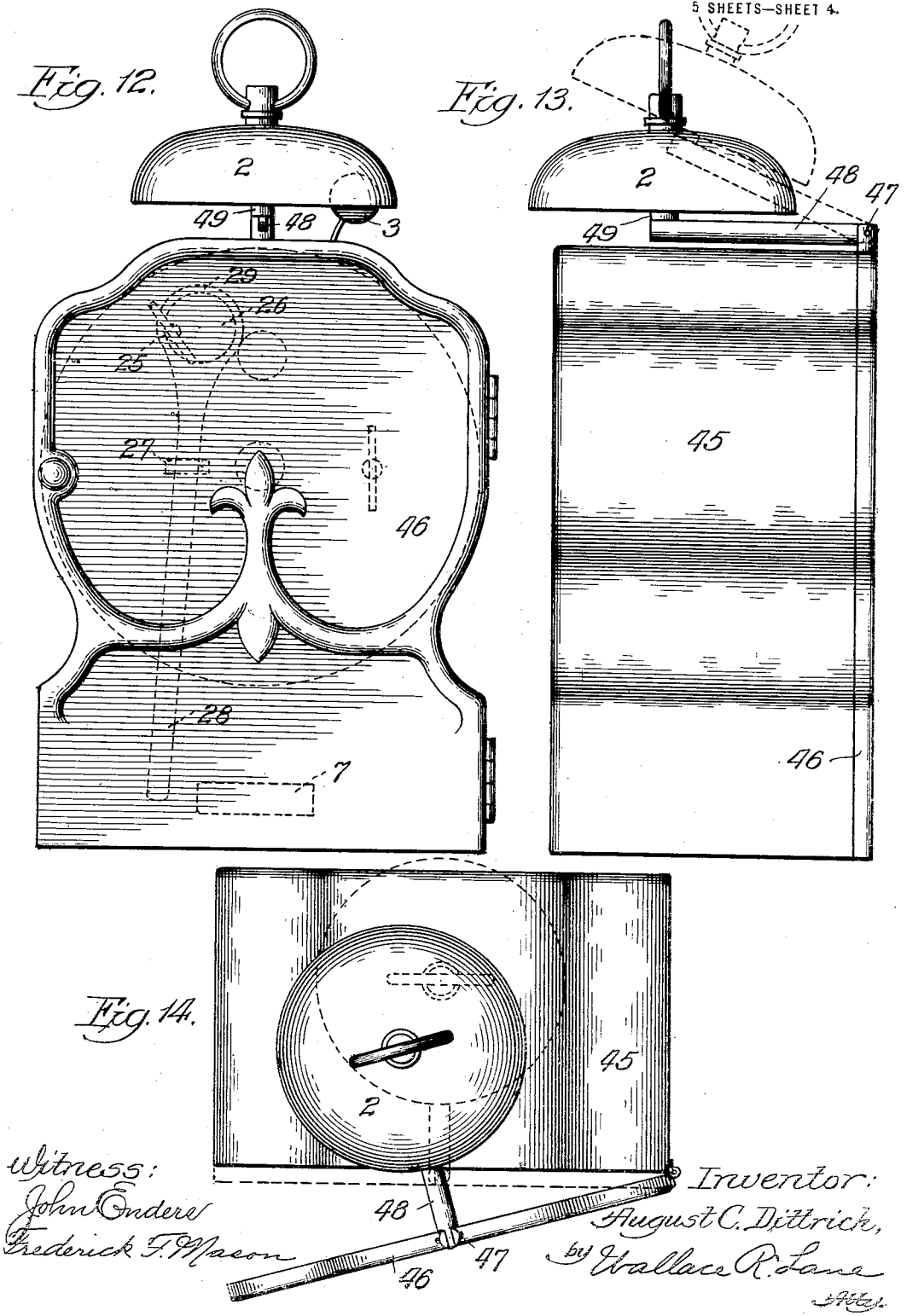

A. C. DITTRICH.
TIME CONTROLLING MEANS FOR SOUND REPRODUCING MECHANISM.
APPLICATION FILED MAR. 7, 1919.

1,373,176.

Patented Mar. 29, 1921.

Witness:
John Enders
Frederick F. Mason

Inventor:
August C. Dittrich,
by Wallace R. Lane
Atty.

UNITED STATES PATENT OFFICE.

AUGUST C. DITTRICH, OF CHICAGO, ILLINOIS.

TIME-CONTROLLING MEANS FOR SOUND-REPRODUCING MECHANISM.

1,373,176.

Specification of Letters Patent.

Patented Mar. 29, 1921.

Application filed March 7, 1919. Serial No. 281,158.

*To all whom it may concern:*

Be it known that I, AUGUST C. DITTRICH, a citizen of the United States, residing at Chicago, in the county of Cook and State of Illinois, have invented certain new and useful Improvements in Time-Controlling Means for Sound-Reproducing Mechanism, of which the following is a specification.

This invention relates to means whereby a sound reproducing mechanism may be automatically set in motion at any predetermined time.

Among the objects of this invention is to provide means for automatically starting a sound reproducing mechanism at a predetermined time, and of such nature that it can be readily carried about and instantly applied to or removed from substantially all popular makes of phonographs; further to make possible the application of such time control means to phonographs or the like without the necessity of cutting into the cabinet or other parts, or in any way disfiguring the machine or its supporting parts; further to produce such time control means in the ordinary clock so that the usefulness and portability of the clock will in no way be impaired; further to provide means whereby the alarm bell may function in its usual manner, or be silenced during the time the clock is operating in combination with the sound reproducing mechanism as desired; further to provide such means that will be positive in action, cheap to manufacture, and which possess the maximum of simplicity, efficiency, and portability; and such further objects, advantages and capabilities as will later more fully appear.

My invention further resides in the combination, construction and arrangement of parts illustrated in the accompanying drawings, and while I have shown preferred embodiments of my invention, I desire it to be understood that the same are intended to be illustrative only, and not as limiting my invention.

In the drawings:

Figure 1 is a perspective view of the upper portion of a phonograph showing my invention applied thereto.

Fig. 2 is a face view of a clock used in carrying out my invention.

Fig. 3 is an edge elevation of the clock shown in Fig. 2, the bottom portion therein being shown in section to illustrate the brake mechanism.

Fig. 4 is an elevational view of the rear side of the clock showing the brake head and means for controlling the release of the same.

Fig. 5 is a section taken on the line 5—5 of Fig. 3.

Fig. 6 is a section taken on the line 6—6 of Fig. 5.

Fig. 7 is a section taken on the line 7—7 of Fig. 6.

Fig. 8 is a sectional view similar to Fig 5, but showing a modified arrangement.

Fig. 9 is a fragmentary horizontal section through the base of the clock and showing a modified form of brake mechanism.

Fig. 10 is a vertical transverse section taken on the line 10—10 of Fig. 9.

Fig. 11 is a fragmentary sectional view taken through the bell of the alarm mechanism.

Fig. 12 is a rear elevation of the clock showing the same positioned in a cabinet and a swinging door hinged upon the rear face.

Fig. 13 is an edge elevation of Fig. 12.

Fig. 14 is a plan view of Fig. 12, but showing the door in partially open position.

Figure 15:
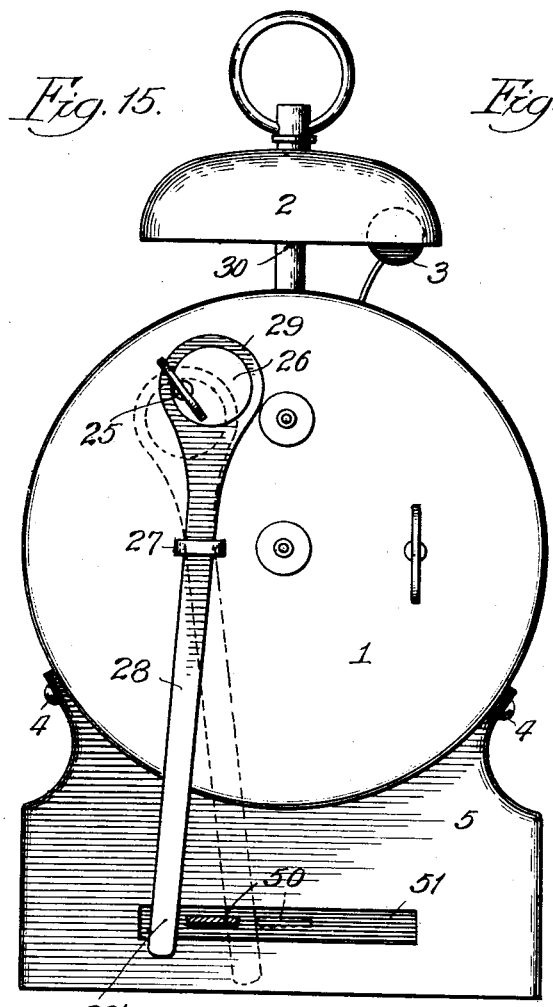
Fig. 15 is a view similar to Fig. 4, but showing a modified construction.

Referring to the drawings in detail, it will be seen in Fig. 1 that my invention comprises a self contained and portable clock, provided with release mechanism whereby the clock may be readily stood in position upon the phonograph cabinet closely adjacent the rotating table with the brake head in frictional engagement with the edge of the turn table, so that upon release of the brake by the time control mechanism, the brake will release the turn table and free the same for rotation; it being understood, of course, that a phonograph record will have first been positioned upon the turn table, so that upon release of the same the phonograph will produce the music or other sounds of the record. By this means one is enabled to be awakened in the morning by his favorite music or other call instead of by the ordinary irritating sound of the usual alarm clock.

My portable time control release device as will be seen in the drawings, comprises an alarm clock 1 of the usual type, carrying the alarm bell 2, clapper 3, and the customary alarm mechanism within (not shown). Adjustably secured to the bottom of the clock by means of screws 4 or other suitable means is the hollow base portion 5, within which is slidably mounted the brake head 6, carrying on its outer end the cushion 7, which may be chamois skin or other suitable soft material incapable of marring or scratching the edge of the turn table. Extending rearwardly from the head 6 is the stem 8, which passes through a suitable aperture at the rear of the casing 5, and is provided upon its outer end with the handle 9. As seen in Figs. 3 to 8, inclusive, the base portion 5 is provided in its rear face with the slot 10, through which the brake head is adapted to be moved. Adjacent the front portion of the side edge of the brake head is formed the slot 11, the function of which will later appear.

In order to confine the movement of the brake head to substantially a straight line, I have provided in the form shown in Figs. 3 to 7, the staple 12, which, as shown, straddles the stem 8 and is driven or otherwise suitably secured in the bottom 13 of the base portion 5. In order to cause the brake head 6 to normally assume the position shown in Fig. 5, there is provided the flat spring 14 (see Figs. 5, 6 and 7), which is slidably mounted at its respective ends in the slots 15 formed in the keepers 16, which as shown are also driven or otherwise suitably secured in the bottom 13. The spring 14 contacts at one side with the upright arms 17 of the plate 18, which as shown in Fig. 5 is suitably secured to the head 6. From this it will be understood that when the handle 9 is pushed, it causes the stem 8 to slide in a direction to move the head 6 outwardly through the slot 10, the upstanding arms 17 will cause the spring 14 to become flexed in a direction to normally tend to return the head 6 to the position shown in Fig. 5.

A modification of this construction is shown in Fig. 8, in which the guiding staple 12 is supplanted by a slot 20 formed in the bottom of the head 6. and which slot coöperates with the screw head 21 to confine movement of the brake head 6 to a straight line in an obvious manner. Also in Fig. 8, I have shown a coil spring 22 to normally tend to return the brake head to retracted position.

Referring now to Figs. 3, 4 and 15, it will be seen that I have provided the winding stem 25 of the alarm mechanism with an eccentric 26 fixed thereon for rotation therewith. Secured upon the back of the clock 1 is the keeper 27 provided with a suitable aperture, through which is slidably mounted the lever arm 28, which carries upon its upper end the eccentric strap 29 for coöperation with the eccentric 26, whereby upon rotation of the winding stem 25 movement will be transmitted to the free end 28' of the lever 28 in an obvious manner. In setting the brake head 6 into operative position, pressure is applied to the handle 9 to move the head 6 outwardly through the slot 10 until the slot 11 is brought into such position that the free end 28' of the lever 28 may be inserted therein in the position shown in Fig. 4; it being understood, of course, that the alarm mechanism has been previously wound, and when the slot 11 is in proper position that sufficient rotation is given to the winding stem 25 to cause the end 28' of the lever arm to enter said slot 11. The pressure upon the handle 9 is then released whereby under action of the spring 14 or 22, the outer edge of the slot 11 will contact with the end 28' of the lever arm.

The clock is then placed in position as shown in Fig. 1 to bring the outer end 7 of the brake head 6 into contact with the turn table A of the phonograph, which also has been previously wound. By setting the alarm mechanism at the desired hour, it will thus be apparent that at such hour the winding stem 25 will commence to rotate upon release of the alarm mechanism, thus moving the lever arm 28 as shown in dotted lines in Fig. 4, which movement releases the brake head 6 and causes it, under action of the spring 14 or 22, to move away from the turn table A, thus freeing the same to permit operation of the phonograph in an obvious manner.

In order that the alarm bell 2 of the clock may be moved away from ringing position when the clock is being used as a time control release for the phonograph, I have provided the pivotal connection 30 in the bell supporting stem (see Fig. 11); one side of the joint member having the shoulder 31 and the other side being rounded as shown at 32, whereby the bell may be readily swung to one side of the vertical (that is, away from the clapper 3), but prevented from swinging on the other side of the vertical whereby when desired to properly hold it in position for coöperation with the clapper 3, when it is desired that this bell should function for ringing in its usual manner. By this means the usefulness of the clock as an ordinary alarm clock is retained, and when the clock is to be used in connection with the phonograph, the bell may be swung out of ringing position, thus silencing the same in order not to interfere with the music of the phonograph.

Referring now to Figs. 9 and 10, a modification of the brake mechanism will be seen, and in which figures there is provided the vertical shaft 33 mounted for rotation in the bracket 34 and the bottom 13, as shown. Fixed to the shaft 33 is the arm 35, which is provided at its free end with the face portion 37 adapted as shown in Fig. 10 to frictionally engage with the edge of the turn table A, to hold the same against rotation. The arm 35 is stamped out at its upper edge to form a rectangular arm or projection 38, behind which is adapted to engage the free end 28′ of the lever 28, whereby to hold the arm 35 in engagement with the turn table. Encircling the shaft 33 is a coil spring 39 normally tending to rotate the arm 35 away from the edge of the turn table. In the present form, the slot in the base is extended to the corner of the base portion and continued the greater portion of the length of the end face as indicated at 40 in Fig. 9. Slidably extending through the slot 40 is the handle 41, which at one end is fixed to the shaft 33, and the function of which handle is to serve as means for swinging the shaft 33 against the action of the spring 39, whereby to bring the arm 35 into locking position. In the form now being described, it will be apparent that by swinging the handle 41 to bring the arm 35 into operative position, the end 28′ of the lever 28 (after the alarm mechanism has been wound) may be swung behind the projection 38 to lock the parts in operative position and with the spring 39 placed under tension. Upon release of the alarm mechanism at the predetermined time, the end 28′ of the lever arm will move out of engagement with the projection 38 and permit the face 37 to move out of contact with the turn table A, then permitting the same to rotate.

In Figs. 12 to 14, I have illustrated the clock as positioned within the casing or cabinet 45, which has hinged thereto at its back face the swinging door 46. Pivotally mounted to the upper edge of this door at 47 is the arm 48, carrying at its outer end the upwardly extending stem 49, upon which is pivotally mounted in the manner illustrated in Fig. 11, the alarm bell 2. When the clock is functioning as a time control release for sound reproducing mechanism, the door 46 will stand open to permit the brake means to contact with the turn table, and when the clock is functioning in its ordinary manner, the door will be closed. From this construction it will be seen that when the door is open and the clock in use in combination with the phonograph, the bell will be swung upon the door, thereby carrying it away from the clapper 3, thus insuring silence of the bell when the phonograph turn table is released for operation. When the door 46 is in closed position and the clock being used for its ordinary purposes, the bell will readily be positioned for coöperation with the clapper 3, as shown in Fig. 12.

Figure 16:
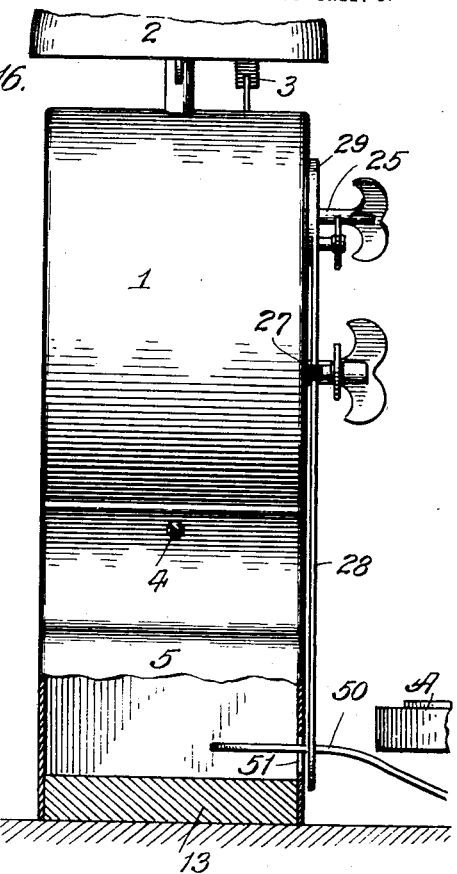
Fig. 16 is an edge elevation of Fig. 15, parts being broken away for sake of clearness.
Figure 17:
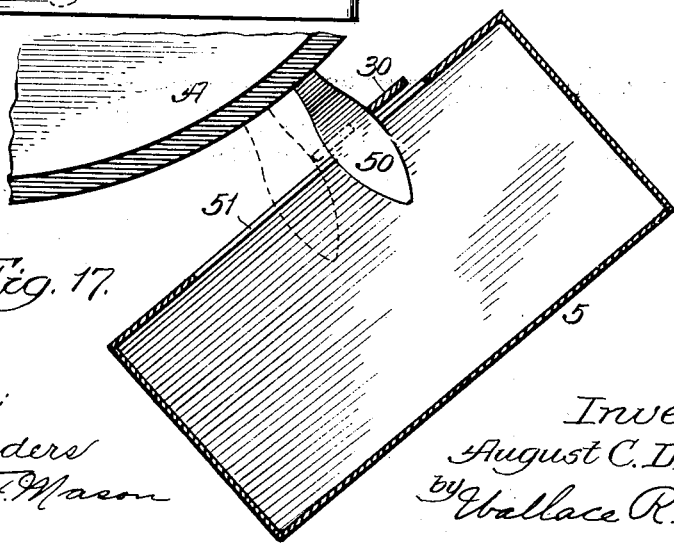
Fig. 17 is a horizontal section through the base portion of the form shown in Fig. 15.

In Figs. 15 to 17, I have illustrated a further modification in which I have omitted the brake head shown in the preceding figures, and have elongated the slot of Figs. 5 and 8, whereby the starting lever 50 found in some of the popular phonographs may be inserted through the slot 51. The alarm mechanism having been previously wound, the lever arm 28 may be positioned as shown in full lines in Fig. 15 to bring its free end 28′ either against or closely adjacent the starting lever 50 when the latter is in position to hold the turn table against rotation. At the arrival of the predetermined hour as governed by the setting of the alarm mechanism, this mechanism will be released, thus causing the lever arm 28 to assume the position shown in dotted lines in Fig. 15, and moving the starting lever 50 into the dotted position shown in this same figure, which movement will be sufficient to permit rotation of the phonograph turn table with the resultant reproduction of the music or other sound of the disk mounted thereon.

From the above, it will be seen that I have produced a time controlling device for phonographs which is simple in construction, cheap to manufacture, and possesses the maximum portability, whereby it may be sold in any store, carried home by the purchaser, and instantly applied for operation with his phonograph as a pleasant alarm call in the morning, or to automatically start the phonograph at any other desired time or occasion.

Having now described my invention,—
I claim:—

1. In apparatus of the class described, a movable brake adapted to engage the rotatable table of a phonograph, an arm extending into engagement with said brake, alarm mechanism including means for converting the rotary movement of the alarm winding stem into longitudinally reciprocatory movement of said arm, and a keeper through which said arm slides upon rotation of said stem, whereby upon operation of said mechanism said arm will be moved to effect the release of said brake to permit rotation of said table.

2. In a clock, a movable brake adapted to reciprocate through the clock and in one position to engage the rotatable table of a phonograph when the clock is stood upon the phonograph cabinet adjacent said table, alarm mechanism, an arm engaging said brake to hold the same in locking position, a keeper through which said arm slides longitudinally, and means connecting said arm and the alarm mechanism, whereby upon operation of the latter, the arm will be moved to release said brake to permit rotation of said table.

3. In a clock, alarm mechanism including a winding stem, a keeper on said clock, an arm slidable through said keeper, a longitudinally slidable brake member adapted to in one position engage the rotatable table of a phonograph, means on said brake adapted to engage said arm to hold said brake in locking position, resilient means normally tending to move said brake out of locking position, and connection between said stem and said arm, whereby upon operation of said alarm mechanism, said arm will be moved to release said brake to permit rotation of said table.

4. In a clock, alarm mechanism including a bell and clapper, said bell being mounted on a divided supporting standard, the parts of which are pivotally connected whereby it may be swung out of ringing position when desired.

5. In a clock, a casing, a door hinged on said casing, and a bell mounted on said door for swinging out of ringing position.

6. In a clock, a casing, a door hinged on said casing, and a bell mounted on said door for swinging out of ringing position, said bell being connected with said door for swinging movement in two directions with relation thereto.

7. In a clock adapted to be removably positioned on a phonograph to releasably hold the turn table thereof against rotation, an alarm mechanism including a winding stem, an eccentric fixed to rotate with said stem, a keeper on said clock, a lever mounted to slide longitudinally in said keeper and having a strap fixed on one end thereof to cooperate with said eccentric, whereby to impart a combined reciprocating and oscillating motion to the free end of said lever, and a brake having a slot adapted to receive the free end of said lever in one position of the lever when the brake is extended to frictionally engage said table, and means to cause said brake to move away from said table to permit its rotation when the free end of the lever is moved out of said slot by said alarm mechanism at a predetermined time.

8. In a clock adapted to be removably positioned adjacent a phonograph turn table, an upper casing, a hollow base portion detachably secured to said casing, a brake reciprocatively mounted in said base portion and adapted to be projected longitudinally out of said base portion to frictionally engage said table, alarm mechanism, and means connecting said alarm mechanism and said brake to automatically release the latter to permit rotation of said table at a predetermined time.

9. In apparatus of the class described, a clock comprising a frame having a brake slidably mounted therein adapted to contact with the rotatable element of a sound reproducing mechanism, alarm mechanism comprising a winding stem, a projection on said stem, and a lever having a cam face whereby said lever will be moved by said projection upon rotation of said stem, said lever and said brake being connected to release the latter upon operation of the alarm mechanism at a predetermined hour.

10. In apparatus of the class described, a clock comprising a frame having a brake slidably mounted therein adapted to contact with the rotatable element of a sound reproducing mechanism, alarm mechanism comprising a winding stem, a projection on said stem, a lever having a cam face whereby said lever will be moved by said projection upon rotation of said stem, and means on said brake connecting said lever and said brake to release the latter upon operation of the alarm mechanism at a predetermined hour.

In witness whereof, I hereunto subscribe my name to this specification.

AUGUST C. DITTRICH.